(No Model.)
B. F. HAMILTON.
GUIDE TRUCK FOR ELECTRIC RAILWAYS.
No. 365,339. Patented June 21, 1887.
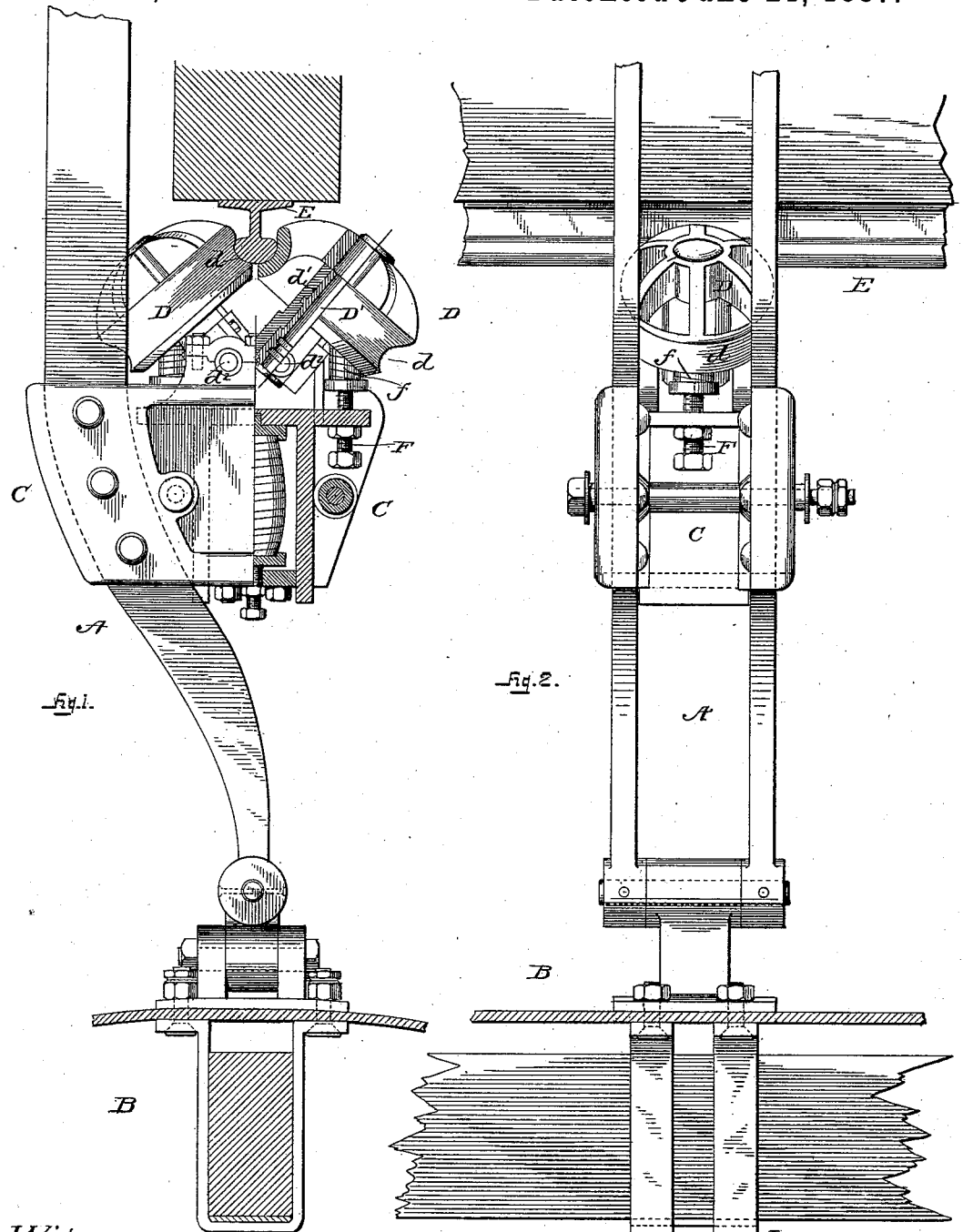
Witnesses:
Inventor:
Benj. F. Hamilton,
by
his Attorney.

UNITED STATES PATENT OFFICE.

BENJAMIN F. HAMILTON, OF BOSTON, MASSACHUSETTS, ASSIGNOR TO THE ENOS ELECTRIC RAILWAY SUPPLY COMPANY, OF SAME PLACE.

GUIDE-TRUCK FOR ELECTRIC RAILWAYS.

SPECIFICATION forming part of Letters Patent No. 365,339, dated June 21, 1887.

Application filed November 11, 1886. Serial No. 218,533. (No model.)

*To all whom it may concern:*

Be it known that I, BENJAMIN F. HAMILTON, a citizen of the United States, residing at Boston, in the county of Suffolk and State of Massachusetts, have invented certain new and useful Improvements in Guide-Trucks for Electric Railways; and I do hereby declare the following to be a full, clear, and exact description of the invention, such as will enable others skilled in the art to which it appertains to make and use the same.

This invention relates to hangers and trucks of suspended-car systems, wherein a car is suspended from a single elevated track by means of a truck running on such track and a hanger connecting the truck and car, and a guide-rail with which a portion of the hanger engages in order to steady the car.

The present invention relates particularly to means whereby swaying or any undue lateral motion of the car while in motion, or while persons are getting on or off, is prevented; and the object of the invention is to produce what may be termed a "guide-truck," which shall be simple and inexpensive in construction and so made that it will be unaffected by curves or inequalities in the track or guide rail with which it is in contact.

With these objects in view my invention resides, essentially, in an attachment designed to be secured to the hanger in a system of the kind above outlined, consisting, essentially, of two wheels arranged upon suitable shafts having their respective axles at angles to each other and to the hanger to which they are attached, the said wheels being provided with indented peripheries which receive the guide-rail.

Furthermore, the invention resides in an attachment consisting, essentially, of the wheels arranged as above set forth and mounted upon yielding and adjustable bearings, whereby inequalities in the track and curves may be passed without jar and without impairing the guiding function of the attachment.

I have illustrated the invention in the accompanying drawings, in which Figure 1 represents an end view, partly in section, of my attachment; and Fig. 2 represents a side elevation.

In the drawings, A represents the hanger, which depends from a suitable truck running upon an upper rail, (not shown,) and B represents a portion of the car to which the lower end of the hanger is attached.

C represents a projection or bracket which is attached to the hanger and extends a suitable distance from the car to bring the wheels D in such position that the indentation $d$ in their peripheries will receive the guide-rail E. The respective shafts D' of the wheels D are attached to suitable portions of the bracket C in such position as to extend at angles to each other and to the hanger. The lower ends of the shafts B' rest in sectional blocks $d'$, which are provided with trunnions $d^2$, which rest in sockets upon the projection C, and thus allow a curvilinear movement of the shafts.

F represents bolts which extend upward through a plate upon the bracket or projection C. Upon the upper ends of these bolts, which are capable of adjustment up and down to regulate their position, are placed coiled springs $f$, which bear against the blocks holding the axles of the wheels D.

In the operation of the guide-wheels all strain is brought upon the springs $f$, and these serve also to hold the wheels in engagement with the guide-rail. In going around curves or in passing over inequalities in the track one or the other of the springs $f$ is compressed, and thus injury to the guide-wheels prevented, while at the same time they are held in proper position to accomplish their purpose.

Having thus fully described my invention, what I claim, and desire to secure by Letters Patent, is—

1. The guiding device for suspended railways, consisting, essentially, of the guide-wheels mounted at angles to each other and mounted upon a yielding support.

2. The guiding device for elevated railways, consisting of the guide-wheels mounted at angles to each other, provided with indented peripheries and mounted upon axles set in swinging bearings, and springs for holding the wheels in operative position, substantially as described.

3. A guiding device for elevated railways, consisting of the projection C, attached to the hanger, the movable blocks $d'$, the axles secured in the boxes, and the wheels mounted at angles to each other and engaging the guide-rail, substantially as described.

In testimony whereof I affix my signature in presence of two witnesses.

BENJ. F. HAMILTON.

Witnesses:
 FRANK D. ALLEN,
 CLARENCE J. MESSER.